(12) United States Patent
Greetham

(10) Patent No.: US 10,609,120 B2
(45) Date of Patent: *Mar. 31, 2020

(54) CUSTOMIZED, CLOUD-BASED DATA COLLECTION TOOL

(71) Applicant: RICOH COMPANY, LTD., Tokyo (JP)

(72) Inventor: David Greetham, Houston, TX (US)

(73) Assignee: RICOH COMPANY, LTD., Tokyo (JP)

( * ) Notice: Subject to any disclaimer, the term of this patent is extended or adjusted under 35 U.S.C. 154(b) by 115 days.

This patent is subject to a terminal disclaimer.

(21) Appl. No.: 15/812,878

(22) Filed: Nov. 14, 2017

(65) Prior Publication Data

US 2019/0149593 A1  May 16, 2019

(51) Int. Cl.
| | |
|---|---|
| *H04L 29/06* | (2006.01) |
| *H04L 29/08* | (2006.01) |
| *G06F 15/16* | (2006.01) |
| *G06F 15/173* | (2006.01) |
| *G06F 8/60* | (2018.01) |
| *G06F 9/445* | (2018.01) |

(52) U.S. Cl.
CPC ............... *H04L 67/06* (2013.01); *G06F 8/60* (2013.01); *G06F 9/445* (2013.01); *H04L 67/1097* (2013.01); *H04L 63/08* (2013.01)

(58) Field of Classification Search
CPC ... G06F 9/445; G06F 21/6218; H04L 67/1097
USPC ........ 709/206, 207, 219, 223, 233; 717/101, 717/120, 177; 718/101, 104
See application file for complete search history.

(56) References Cited

U.S. PATENT DOCUMENTS 9,064,129 B2 * 6/2015 Kounga ................... G06F 21/44
2009/0150431 A1 6/2009 Schmidt
(Continued)

OTHER PUBLICATIONS

"Installation and Configuration Guide"—EMC VIPR SRM, Dell EMC, Jul. 2017 https://www.dellemc.com/en-us/collaterals/unauth/technical-guides-support-information/products/networking-4/docu85376.pdf (Year: 2017).*

(Continued)

*Primary Examiner* — Randy A Scott
(74) *Attorney, Agent, or Firm* — Hickman Palermo Becker Bingham LLP; Malgorzata A. Kulczycka

(57) ABSTRACT

An approach is provided for generating a customized, cloud-based data collection tool for collecting data from computer resources of a target system. In an embodiment, the method comprises: receiving a request to perform a data collection from one or more target computer resources; wherein the request includes one or more requirements that are specific to the data collection; based on, at least in part, the requirements, generating a customization specification for generating a customized collector that is specific to the data collection to be performed on the target computer resources; and transmitting the customization specification to a deployment engine to cause the deployment engine to: based on, at least in part, the customization specification, generate the customized collector that is specific to the data collection to be performed on the target computer resources; and transmit the customized collector, for generating the customized collector, to a cloud storage for storing.

20 Claims, 6 Drawing Sheets

(56) References Cited

U.S. PATENT DOCUMENTS

| | | |
|---|---|---|
| 2009/0150866 A1 | 6/2009 | Schmidt |
| 2010/0185875 A1* | 7/2010 | Mayer .................... G06Q 10/06 713/189 |
| 2010/0250644 A1 | 9/2010 | Toomey |
| 2011/0213875 A1* | 9/2011 | Ferris .................... G06F 9/5072 709/224 |
| 2011/0320480 A1 | 12/2011 | Kisin |
| 2015/0039889 A1 | 2/2015 | Andoni |
| 2016/0246586 A1* | 8/2016 | Madanapalli ............. G06F 8/65 |
| 2016/0253346 A1* | 9/2016 | Greetham ............. G06Q 10/10 707/754 |
| 2016/0380990 A1 | 12/2016 | Jarroush |
| 2017/0041296 A1 | 2/2017 | Ford |
| 2019/0149535 A1 | 5/2019 | Greetham |

OTHER PUBLICATIONS

Greetham, U.S. Appl. No. 15/812,887, filed Nov. 14, 2017, Office Action, dated Oct. 21, 2019.

\* cited by examiner

300 Example Customization Specification

- Date, Time and Time Period Of Data to be Collected
- Expiration Date, Time
- Case Name or Container Name of Case
- Chunk Size
- File Types to be Searched
- File Extensions of Data to be Searched
- Sources to be Searched
- Attachments to be Searched
- Legal Forms (Court Orders) to be Searched
- Storage Types
- Storage Locations
- User Credentials
- Group Credentials
- Time Constraints
- Processing Types
- Communications Methods
- Email Addresses
- Notification Types
- Error Handling Procedures
- Location for Storing Collected Data
- Matching Unique, One-Time Deployment Key

FIG. 3

CUSTOMIZED, CLOUD-BASED DATA COLLECTION TOOL

FIELD

Embodiments relate generally to collecting electronic data from target devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted as prior art by inclusion in this section.

Current approaches for collecting electronic data from target systems have many shortcomings. For example, some collection systems need to be manually installed on the target systems. This may raise concerns about the integrity and security of the collected data. Also, installing some collection systems may be performed only by system administrators who have specialized knowledge, and such administrators may be unavailable in some situations. This may raise concerns about the efficiency of the data collection process.

Some electronic discovery (eDiscovery) systems collect all data residing on target computer resources even if certain data residing on the resources is neither requested nor desired. Relying on such systems may impede achieving proportionality between the cost of the eDiscovery and the amount of damages sought by the claimants.

Some eDiscovery systems are configured to store collected data only in non-cloud-based storage systems that usually have limited accessibility and capacity. Such systems also offer limited portability.

SUMMARY

An approach is provided for collecting data from computer resources of a target system. In an embodiment, one or more non-transitory computer-readable storage media store instructions which, when processed by one or more processors, cause receiving a request to perform a data collection on one or more target computer resources. The request includes one or more requirements that are specific to the data collection to be performed on the target computer resources.

Based on, at least in part, the request, a customization specification for creating a customized collector is generated. As used herein, the term "customization specification" refers to data that defines one or more attributes of a collection to be performed. According to one embodiment, a customization specification is used to generate a customized collector, as described in more detail hereinafter. Customization specification, also referred to as customization specification data, includes data that describes what, from where, and how is to be collected. The customization specification data provides a recipe for generating and customizing the customized collector. The customization specification may specify for example, file types of data to be collected, target computer resources from which the data is to be collected, a time zone for collecting the data, a case name, a chunk size, an expiry date, a signature analysis indicator, a parse/compress indicator, a parse email indicator, local disks indicators, removable disks indicators, and/or mapped network shares indicators.

The customization specification is transmitted to a deployment engine to cause the deployment engine to generate the customized collector. The customized collector is generated based on, at least in part, the customization specification. The customized collector is specific to the data collection to be performed on the target computer resources. The customized collector is transmitted to a cloud storage for storing.

A custodian of the target computer resources downloads the customized collector onto a collector computer, and initiates execution of the customized collector to perform the data collection from the target computer resources. Executing the customized collector includes collecting data that is specified by the customization specification.

BRIEF DESCRIPTION OF THE DRAWINGS

In the figures of the accompanying drawings like reference numerals refer to similar elements.

FIG. 3 is a block diagram that depicts an example customization specification.

DETAILED DESCRIPTION

Figure 1:
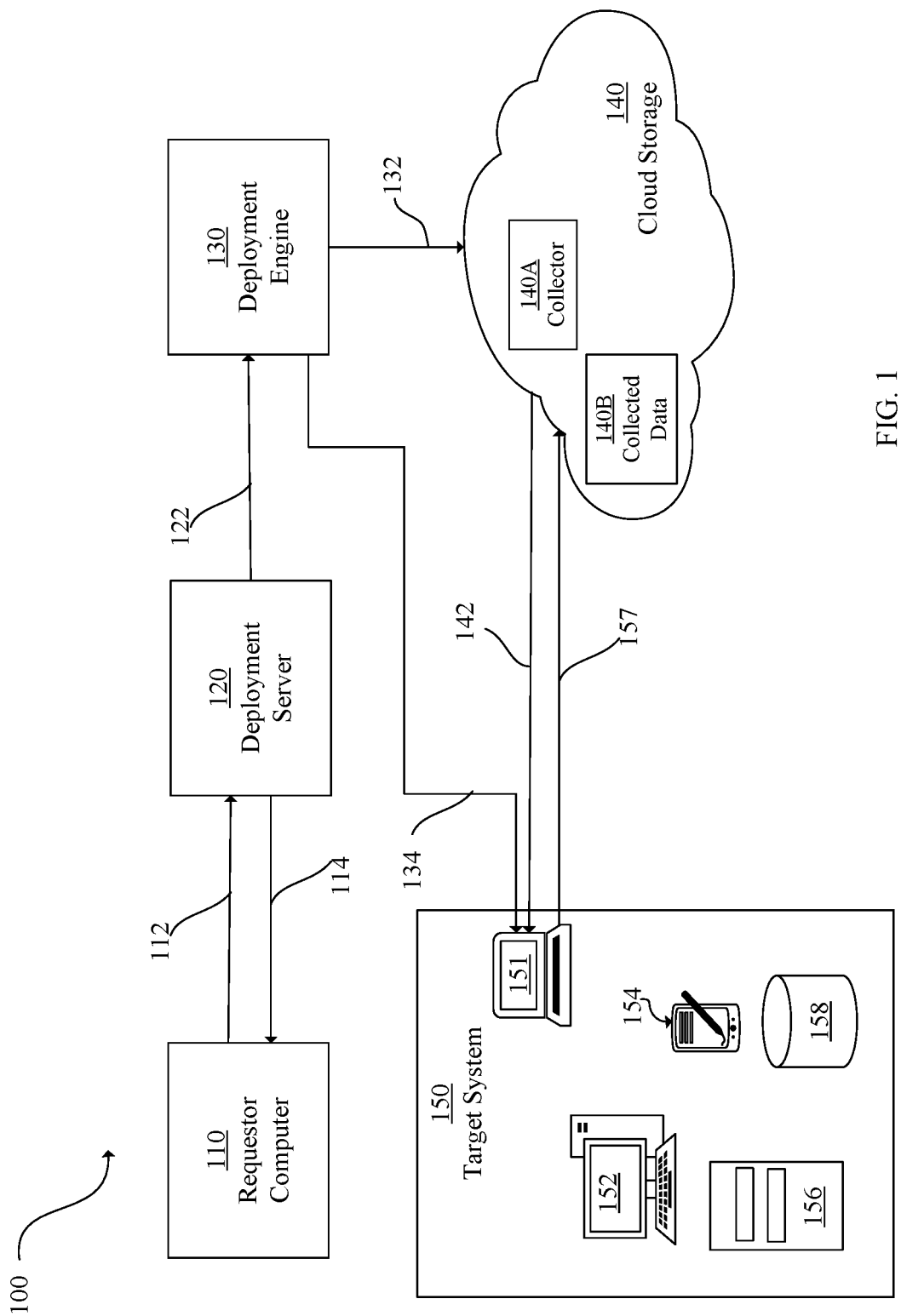
FIG. 1 is a block diagram that depicts an example arrangement for a cloud-based data collection system architecture.

In the following description, for the purposes of explanation, numerous specific details are set forth in order to provide a thorough understanding of the present approach. It will be apparent, however, to one skilled in the art that embodiments may be practiced without these specific details. In other instances, well-known structures and devices are shown in block diagram form in order to avoid unnecessarily obscuring the embodiments. Various embodiments are described hereinafter in the following sections:

I. OVERVIEW
II. CLOUD-BASED DATA COLLECTION SYSTEM ARCHITECTURE
   A. Requestor Computer
   B. Deployment Server
   C. Deployment Engine
   D. Cloud-Based Storage
   E. Target System
III. EXAMPLES OF DATA COLLECTION SERVICES
   A. Example Services Provided by a Deployment Server
   B. Example Services Provided by a Collector
   C. Example Services Provided by a Custodian Computer
IV. EXAMPLE COLLECTOR
   A. Example Customization Specification
   B. Examples of Customized Collectors
V. EXAMPLE PROCESS FOR A CLOUD-BASED DATA COLLECTION VI. EXAMPLE WORKFLOW FOR A CLOUD-BASED DATA COLLECTION
VII. BENEFITS OF CERTAIN EMBODIMENTS
VIII. IMPLEMENTATION MECHANISMS I. Overview An approach is provided for a customized, secure, cloud-based data collection system that improves the process of collecting electronic data from target systems. The approach may be implemented in a data discovery application configured to perform the electronic data discovery. The examples included herein are provided merely for the purpose of explaining some implementations, and are not to be viewed as limiting the scope of the presented approach. For instance, the examples presented herein in the context of legal discovery or in the context of an audit process are not to be viewed as limiting in any way.

In an embodiment, an approach for a cloud-based data collection system improves the process of collecting electronic data from a target system by generating a customized collector for collecting specific data from specific resources of a target system. The collector may be customized to the target system and to the type of data that is to be collected from the target system.

In an embodiment, a deployment service generates a customization specification for a customized collector, and sends the customization specification to a deployment engine. Upon receiving the customization specification, the deployment engine uses the specification to generate the customized collector. The customized collector is specific to the computer resources of the target system. Customizing the collector and providing the customized collector to a custodian of the target system allows collecting only the requested data, and collecting the data in the way that is customized to the configuration of the target resources of the custodian.

As the customized collector is executed on the target system, only the data that meets the customization criteria is collected, and only the resources that meet the customization criteria are searched. Once the collector finishes the data collection, the collected data is encrypted and stored in a cloud-based storage system. Once the data collection is completed, the collection requestor is notified and provided with the information about a location, on the cloud-based storage system, where the encrypted, collected data is stored.

The customization allows specifying the types of data that are required. This allows avoiding situations in which more data is collected from the target systems than is needed, and in which the cost of collecting the data from the target systems becomes unreasonably high in light of the damages that are sought. For example, if the requested damages are relatively high, then the scope of the discovery may be relatively broad and comprehensive. However, if the requested damages are relatively low, then the scope of the discovery may be relatively narrow and specialized.

The approach also improves the accessibility of discovery processes by providing an enhanced user interface for customizing a collector. This may include providing a user interface that has extensive functionalities for determining types of data to be collected, target resources from which the data is to be collected, storages on which the collected data is to be stored, and types of reports to be prepared based on the collected data.

Furthermore, the approach allows engaging an independent data collection service to perform data collection in a secure and autonomous manner. For example, a deployment server and a deployment engine may be used to generate and deploy a secure collector that is customized to collect data from a target system. Both the deployment server and the deployment engine may remain independent from the parties and the law suit between the parties.

The customized collector may be secured with a unique, one-time key that a custodian of the target system is expected to use to download the collector from the cloud storage. Once the collector is successfully downloaded to the target system, the collector is installed and initiated for execution.

A unique deployment key may be provided to a custodian separately from providing the customized collector or a hyperlink to the customized collector. The key may be provided to the custodian separately from providing the email notifying the custodian that the collector is available for downloading. The key may be provided via email, or verbally; for example, over the phone. The key may also be provided via a letter. Providing the deployment key to the custodian separately from providing the collector affords an additional security measure that may be unavailable if the customized collector and the key are provided in one communication. For example, the likelihood of success of intercepting two separate emails (one with a hyperlink to the collector and another with the key) is lower than the likelihood of success of intercepting one email that includes both the link and the key.

Furthermore, providing the link and the key separately requires that the custodian makes a more significant effort in parsing and using the information than if the key and the link were provided in one communication. If the key and the link are provided separately, then the custodian needs to identify for example, two separate emails in his email inbox, extract the key from one of the emails, extract the link from another email, use the link to access the collector, and then use the key to authenticate himself to the collector.

An approach presented herein allows improving the process of collecting electronic data from target systems in many ways. For example, it enhances the process of eDiscovery while maintaining proportionality between the cost of the discovery and the amount of damages being sought. By taking into consideration the amount of damages in determining the scope of the discovery, the cost of the discovery may be tailored to the amount that is reasonable to the involved parties. This allows avoiding situations where the cost of the legal discovery is disproportionally high to the amount of damages.

Moreover, the approach improves the accessibility of collectors and collected data. For example, the approach may be configured to utilize any type of storage media, including cloud-based storages. For example, a customized collector may be stored in a cloud-base storage system. The collector may be available for downloading form the cloud storage to the target system. Once the requested data is collected, the collected data may also be stored in the cloud storage.

Furthermore, the approach improves the reporting and analyzing capabilities of the eDiscovery processes. For example, it allows generating various types of reports based on the data collected and stored in cloud-based systems.

II. Cloud-Based Data Collection System Architecture

FIG. 1 is a block diagram that depicts an example arrangement for a cloud-based data collection system architecture. In FIG. 1, arrangement 100 includes a requestor computer 110, a deployment server 120, a deployment engine 130, a cloud storage 140, and a target system 150.

Example arrangement 100 may be implemented in computer systems configured to perform any type of electronic data discovery. The examples included herein are provided merely for the purpose of explanation of example implementations, and are not to be viewed as limiting the implementation scope of arrangement 100.

Requestor computer 110, deployment server 120, deployment engine 130, cloud storage 140, and target system 150 may be part of one or more communications networks and may be communicatively coupled with each other via various communications links. The types and configurations of the networks and links may vary, and may depend upon the implementation. Communications links may be established across any number of communications networks such as, for example, one or more Local Area Networks (LANs), Wide Area Networks (WANs), Ethernet networks or the Internet, and/or one or more satellite or wireless links.

Example arrangement 100 may include various types of communications links 112, 114, 122, 132, 134, 142, 157, used to facilitate communications between requestor 110, deployment server 120, deployment engine 130, cloud storage 140, and target system 150.

A. Requestor Computer

Requestor computer 110 is a computer-based-system that may be implemented in hardware, computer software, or any combination of hardware and computer software. Requestor computer 110 may host various applications and store electronic document data that includes structured data and unstructured data.

Requestor computer 110 may be any type of client computer system or device. It may include one or more processors, and one or more memory units, including volatile memory and non-volatile memory. It may also include a display system and a storage system. Examples of client devices include personal or laptop computers, workstations, tablet computers, personal digital assistants (PDAs), and telephony devices such as smart phones. Requestor computer 110 may host software applications, such as Web browser applications, graphical user interface applications, and the like.

Requestor computer 110 may be implemented in a mobile device, such as a smart phone, a tablet, a portable computer, and the like. A mobile device implementing requestor computer 110 may be configured to establish a wireless communications connection with deployment server 120, and use the connection to submit collection requests to deployment server 120 and to receive notifications, updates and reports from deployment server 120.

Requestor computer 110 may be configured to receive requests for collecting data from target system 150. Requestor computer 110 may be configured to provide a user interface for providing and customizing the request for collecting data. The requests may be communicated from requestor computer 110 to deployment server 120. The requests may specify types of data to be collected from target system 150, timestamps that the collected data needs to have associated, file extension of the collected data, types of storages from which data is to be collected, email addresses for which data is to be collected, names of cases or matters for which data is to be collected, and the like. Examples of customization specifications for collecting data are described in FIG. 3.

Requestor computer 110 may be configured to receive notifications and updates pertaining to data collections. For example, requestor computer 110 may receive a confirmation that a request for collecting particular data from target system 150 was received, or a notification that a collection of the particular data from target system 150 has started. Furthermore, requestor computer 110 may receive a notification that the requested particular data has been collected from target system 150 and stored in cloud storage 140.

Requestor computer 110 may be configured to request and receive reports pertaining to data collections. The reports may include, for example, results of a data analysis of the collected data, results of statistical analysis of the collected data, and the like. Requestor computer 110 may also be configured to provide tools and user interfaces for requesting customized reports and for customizing the content and appearance of the reports.

B. Deployment Server

Deployment server 120 is a computer-based-system used to receive requests for collecting data from one or more target systems 150. Deployment server 120 may be any type of client device, such as a personal computer, a laptop computer, a workstation, a tablet computer, a personal digital assistant (PDA), a smart phone, and the like. Deployment server 120 may host software applications including for example, Web browsers. Deployment server 120 may include a user interface, one or more processors and memory units, including volatile memory and non-volatile memory. Examples of services that may be provided by deployment server 120 are described in FIG. 2A.

Deployment server 120 may be implemented in a mobile device. For example, data deployment server 120 may be implemented in a smart phone, a tablet, a portable computer, and the like. A user of the mobile device may invoke an application residing on the mobile device, and use the application to receive requests for collecting electronic data from target system 150.

C. Deployment Engine

Deployment engine 130 is a computer-based-system that is communicatively coupled with deployment server 120 and cloud storage 140 via wireless and/or wired communications links. Deployment engine 130 may be configured to receive instructions from deployment server 120. Upon receiving the instructions, deployment engine 130 may generate a secure, customized collector, and store the collector according to the received instructions. For example, upon receiving instructions from deployment server 120, deployment engine 130 may use the instructions to generate a collector, determine a location for storing the collector, and use the determined location to store the collector as a collector 140A in cloud storage 140.

D. Cloud Storage

Cloud storage 140 is a computer-based storage system implemented in the cloud. Cloud storage 140 provides storage services for maintaining, managing, and backing-up data, and for making the stored data available to users via communications connections. Access to the data stored in cloud storage 140 is usually secured with passwords, and the data is usually encrypted. Cloud storage 140 may be configured to store for example, collector 140A and collected data 140B.

Cloud storage 140 may be implemented in one or more computing devices configured to store data and data files on one or more servers. For example, cloud storage 140 may be implemented in devices such as magnetic disks, optical disks, and the like.

Cloud storage 140 may be configured to store information received from requestor computer 110, deployment server 120, deployment engine 130, and target system 150, and to make the stored information available to the above entities.

E. Target System

Target system 150 may be configured to store user data, system data, email data, and any other type of electronic data. Target system 150 is a computer-based-system from which some data is collected as a collector is executed.

Target system 150 may be configured as a multi-unit computer system that includes a plurality of computer devices communicatively coupled with each other via wireless and/or wired communications links. Examples of computer devices may include workstations 151-152, a tablet computer, a PDA 154, a data server 156, a database storage system 158, a smart phone, and the like. Target system 150 may host software applications such as Web browsers and data processing applications, email server applications, and the like. While FIG. 1 depicts only a few examples of user devices that may be included in target system 150, other computer devices and systems may also be included in target system 150.

Custodian workstation 151 of target system 150 is a workstation that is used by a custodian of target system 150. A custodian of a target system in the context of collecting data from the target system is a person who is responsible for managing and maintaining one or more computer resources in target system 150, and who is responsible for downloading, installing and initiating execution of a collector on target system 150. The custodian of target system 150 may be for example, an owner of target system 150, a system administrator of the computer devices included in target system 150, or a service provider that manages computer resources of target system 150.

III. Examples of Data Collection Services

A. Example Services Provided by a Deployment Server

Figure 2C:
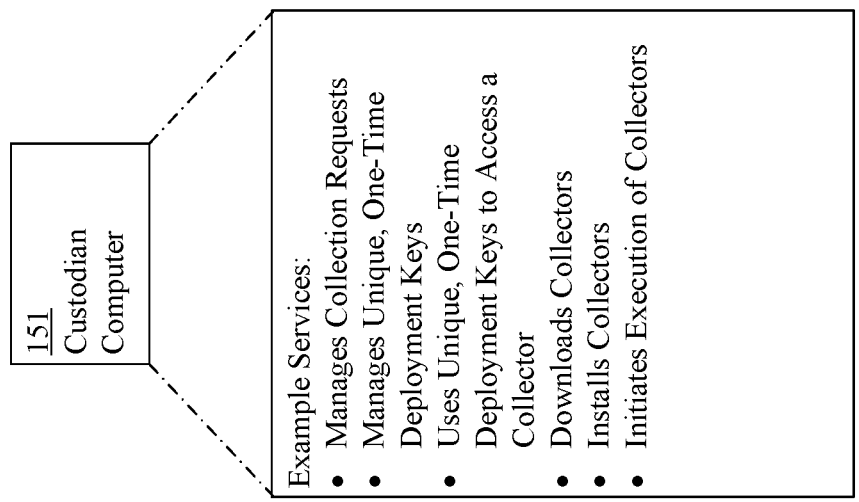
FIG. 2C is a block diagram that depicts example services provided by a custodian computer.
Figure 2B:
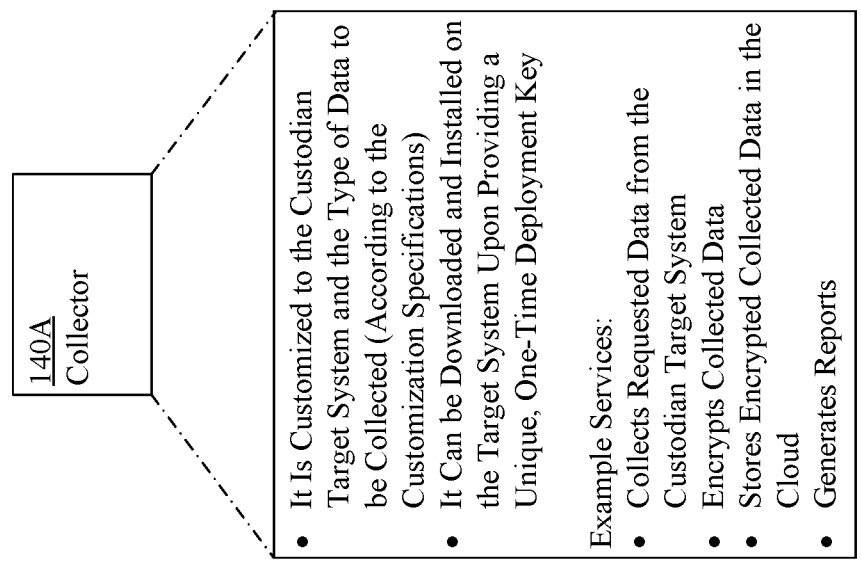
FIG. 2B is a block diagram that depicts example services provided by a customized collector.
Figure 2A:
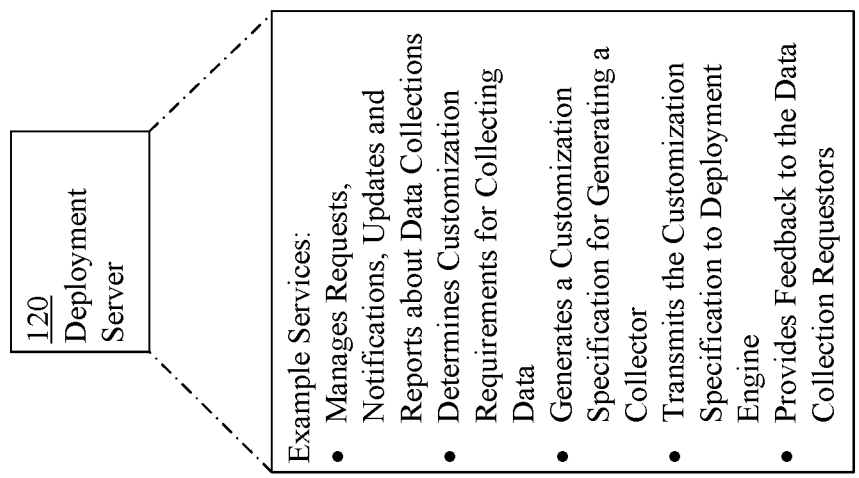
FIG. 2A is a block diagram that depicts example services provided by a deployment server.

FIG. 2A is a block diagram that depicts example services provided by deployment server 120. The example services described in FIG. 2A are provided to illustrate certain examples, not to exhaust the list of services that deployment server 120 may provide.

The example services may include managing requests, notifications, updates and reports related to data collections. Requests may include the requests received from requestor computer 110 and may pertain to requesting particular data from target system 150. Notifications may include confirmation that collection requests have been received, that data collection has started, that data collection has been finished, that the collected data has been stored in cloud storage 140, and that the collected data is available to a requestor.

The example services may also include determining customization requirements for a data collection. The requirements may be provided from requestor computer 110, or may be entered via a user interface implemented in deployment server 120.

The services provided by deployment server 120 may also include generating a customization specification for a customized collector. For example, upon receiving customization requirements for a data collection, deployment server 120 may use the received customization requirements to generate a customization specification for creating a customized collector. Deployment server 120 may be configured to specify file types to be searched, sources to be searched, whether, or which, attachments are to be searched, and whether legal forms, such as court orders and other legal documents, are to be included in the legal discovery. Furthermore, deployment server 120 may be configured to specify storage types that are to be searched, and storage locations that are to be searched or used to store collected data and data files.

Deployment server 120 may also be configured to retrieve and provide user credentials, group credentials, and other authentication information to be used by a collector to perform a data collection. Furthermore, deployment server 120 may be configured to specify time constrains for performing legal discovery tasks, types of processing, types of modifications (if any), methods of communicating results of legal discovery, email addresses to be used by collector 140A and/or a custodian, types of notifications, error handling procedures, and the like.

Moreover, deployment server 120 may be configured to specify a hyperlink to cloud storage 140 for storing collector 140A, and specify an execution environment for executing collector 140A.

The services provided by deployment server 120 may also include providing feedback to requestors who provided requests for data collections. For example, deployment server 120 may generate notifications to the requestors when the corresponding collectors have been deployed and when the requested data has been collected and stored in cloud storage 140.

The services may also include providing one-time access keys to a custodian of target system 150 to allow the custodians to download, install, and initiate collectors on target system 150. Alternatively, the key may be generated by deployment engine 130.

The services may further include providing reports pertaining to the collected data. For example, deployment server 120 may generate and provide a graphical user interface to requestors who requested data collections, and allow the requestors to customize and request data reports that summarize information about the collected data.

B. Example Services Provided by a Collector

FIG. 2B is a block diagram that depicts example services provided by collector 140A. The example services described in FIG. 2B are provided to illustrate certain examples, not to exhaust the list of services that may be provided by collector 140A.

Collector 140A is usually executed on target system 150 to collect particular data stored at particular resources of target system 150. Collector 140A is usually downloaded and installed on target system 150 once a custodian provides a unique, one-time deployment key. The key may be provided to the custodian by either deployment server 120 or deployment engine 130.

Example services provided by collector 140A include collecting data from target system 150 according to a customization specification. The services may also include encrypting the collected data and storing the encrypted, collected data in cloud storage 140.

Collector 140A may also be configured to accept requests for generating reports pertaining to the collected data, and to generate the requested reports.

C. Example Services Provided by a Custodian Computer

FIG. 2C is a block diagram that depicts example services provided by custodian computer 151. The examples depicted in FIG. 2C are to be viewed as non-limiting examples of the custodian services.

Custodian computer 151 may receive requests for providing credentials for access to resources of target system 150. For example, the custodian of target system 150 may be asked to provide access credentials for accessing the user's data stored on devices of target system 150. The credentials for accessing system data stored on devices of target system 150 may be used to generate a customized collector, and to allow the collector to access the resources of target system 150.

Custodian computer 151 may also receive one-time, unique deployment keys for accessing and installing collector 140A, and requests for downloading collector 140A onto computer systems of target system 150.

Upon receiving a notification about a legal discovery request, a custodian may be asked for example, to provide the one-time unique key to access collector 140A, and select an indicated hyperlink to download collector 140A onto computer resources of target system 150.

The services may also include initiating an execution of collector 140A on computer resources of target system 150. For example, a custodian may be provided with instructions for starting collector 140A once the collector is downloaded onto target system 150.

Collection of data from target system 150 may include collecting various types of data, including data files having specific types, hosted by specific devices, and residing in specific directories. For example, the collection may include collecting data files that are JPG image files hosted by workstation 152.

In an embodiment, identifying data that have specific types is performed based on unique signatures that are embedded in data files. Using unique signatures to identify the files to be collected is more reliable than using file extensions included in the file names because the file extensions may not necessarily correspond to the actual type of the file. Relying on the file signatures allows a more accurate selection of the files for the collection than selecting the files based on the file extensions.

IV. Example Collector

A. Example Customization Specification

FIG. 3 is a block diagram that depicts an example customization specification 300. Example customization specification 300 is used to generate collector 140A, and it specifies the capabilities and functionalities of collector 140A.

Customization specification 300 includes information that describes types of data to be collected and resources of target system 150 from which the data it to be collected. For example, the customization specification may specify one or more of: one or more file types of data to be collected, the one or more target computer resources from which the data is to be collected, a time zone for collecting the data, a case name, a chunk size, an expiry date, a signature analysis indicator, a parse/compress indicator, a parse email indicator, one or more local disks indicators, one or more removable disks indicators, or one or more mapped network shares indicators.

Customization specification 300 may specify that collected expiration dates for the files. The expiration dates may define a time period during which the requested files were created or updated. Customization specification 300 may also include case names to be used to identify the data to be collected.

B. Examples of Customized Collectors

A customized collector is an executable program that is configured to perform data collection according to a customization specification. A collector may be generated by deployment engine 130 according to the customization specification. Deployment engine 130 may store the collector as collector 140A in cloud storage 140, and notify a custodian of workstation 151 in target system 150 that collector 140A is ready for downloading onto target system 150.

Collector 140A may be configured to collect data and data files from computer resources of target system 150, determine data formats and media for sending the collected data, and transmit the collected data in logical containers that are compatible with the determined data formats.

Collector 140A may be configured to send notifications to users. Notification may include notifications to a custodian of target system 150, notifications to deployment server 120, and/or notifications to a user of requestor computer 110.

As collector 140A is executed on target system 150, collector 140A collects data, and stores the collected data in cloud storage 140. The process of collecting data from target system 150 allows preserving the integrity and security of the collected data because the data is collected from target system 150 without interactions with users and owners of target system 150.

Storing the collected data may involve determining a format that is suited for transmitting and storing the collected data in cloud storage 140. Selecting a suitable format may be viewed as determining a "container" in which the collected data and data files may be stored. A container may be selected based on a variety factors, including, without limitation, a size to the collected data, an available bandwidth, a size of target system 150, and a size of cloud storage 140.

Once a collection of data from target system 150 is completed, collector 140A may generate an electronic communication and cause sending the communication to deployment server 120 and/or deployment engine 130. The communication may include an indication that the data and/or data files have been collected and stored in cloud storage 140.

Collector 140A may be configured to receive requests for reports pertaining to the collected data. In response to receiving a request for a report, collector 140A may generate the requested report based on the collected data, and provide the report to the requestor. The request may be customized according to instructions included in the request. The instructions may be provided by the requestor via a graphical user interface or on-a-fly.

V. Example Process for a Cloud-Based Data Collection

A process of requesting, collecting and storing data is performed by one or more entities that communicate and exchange information with each other. For example, a user of requestor computer 110 may generate a request for performing a legal discovery on target system 150, and transmit the request to deployment server 120. Based on the received request, deployment server 120 may generate a customization specification, and transmit the customization specification to deployment engine 130. Deployment engine 130 may generate a customized collector, and deploy the collector to cloud storage 140.

Deployment engine 130, or deployment server 120, may also send a notification to a custodian of target system 150 to provide information about the collector and instructions for downloading, installing and executing the collector. Deployment engine 130 may also transmit to the custodian a unique, one-way key for accessing, downloading, and installing the collector. The key may be sent separately from the instructions. Once the collector is downloaded onto target system 140, the collector is executed to collect the requested data. Once the requested data is collected, it is stored in cloud storage 140 as collected data 140B. Collected data 140B may be encrypted, and a hyperlink to the encrypted, collected data may be provided to deployment server 120, or directly to requestor computer 110.

Figure 4:
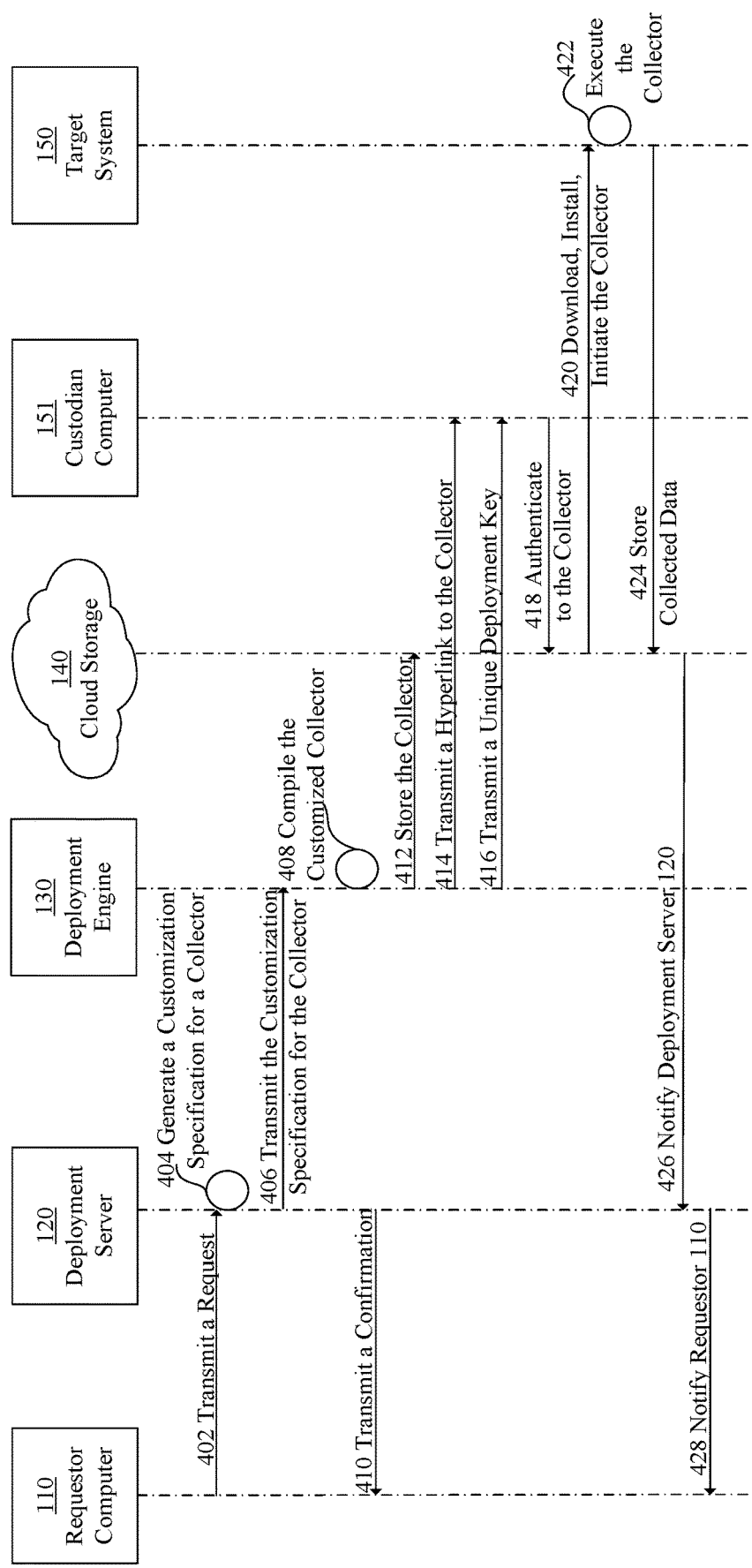
FIG. 4 is a block diagram that depicts an example approach for collecting data from a target system using a customized, secure, cloud-based data collection tool.

FIG. 4 is a block diagram that depicts an example approach for collecting data from a target system using a customized, secure, cloud-based data collection tool. According to the depicted example, a user of requestor computer 110 generates a request to collect certain data from target system 150. The request may be issued for any reason. For example, the request may be issued to execute a legal discovery.

The request may specify the type of data and data files to be collected, the time periods for which the data and data files are to be collected, computer resources of target system 150 from which the data and data files are to be collected, and the like. The user-provided requirements are also referred to as collection definition data. The collection definition data may be included in the request generated at requestor computer 110.

In step 402 of FIG. 4, the request is transmitted from requestor computer 110 to deployment server 120. The request may include collection definition data containing the details of the request. Alternatively, the request may include one or more hyperlinks pointing to locations, at cloud storage 140, at which the collection definition data has been stored.

Upon receiving the request from requestor computer 110, deployment server 120 may analyze the request to identify the information included in the request that can be used to generate a customization specification.

In step 404, deployment server 120 generates a customization specification. This may include extracting the information included in the request received from requestor computer 110, and using the extracted information to generate the customization specification.

A customization specification may include information about file types of data files to be searched, sources to be searched, indications of whether, or which, attachments are to be searched, and indications whether legal forms, such as court orders and other legal documents, are to be included in legal discovery. The customization specification may also include information about storage types that are to be searched, and storage locations that are to be searched. Furthermore, the customization specification may include user credentials, group credentials and other authentication information to be used by the collector to perform data collection.

The customization specification may further include time constrains for performing the legal discovery, types of processing, types of modifications (if any), methods for communicating results of the legal discovery, email addresses to be used by the collector and/or a custodian, types of notifications, error handling procedures, and the like.

In step 406, deployment server 120 transmits the customization specification for generating the collector to deployment engine 130.

In step 408. deployment engine 130 generates the collector. The process of generating the collector is also referred to as compiling the collector. The collector is customized according to the customization specification, and is customized to the specific resources of target system 150. The process of generating the collector and characteristics of the collector has been described above.

In step 412, deployment engine 130 stores the collector in cloud storage 140. Deployment engine 130 determines the location, at cloud storage 140, at which the collector has been stored. For example, deployment engine 130 may determine a hyperlink to the location at which the collector has been stored. The hyperlink to the location is transmitted to the custodian in step 414.

In step 416, deployment engine 130 generates a unique, one-time key for accessing the collector. The key is going to be used by the custodian of target system 150 to access, download and install the collector on target system 150, and/or to initiate execution of the collector on target system 150. Deployment engine 130 transmits the key to the custodian. Alternatively, the key may be generated and transmitted by deployment server 120.

Deployment engine 130, or deployment server 120, may also transmit, to the custodian, instructions for deploying the collector. The instructions may be sent in any form of a notification, such as an email, a text, or a calendar invitation. The notification to the custodian may be transmitted to notify a user of target system 150 that target system 150 is for example, in a litigation hold. The electronic mail may also indicate that a court order has been issued to collect data and data files form target system 150. The email may also include a copy of the court order. The email may also include the hyperlink to the location at which the collector is stored. In addition to transmitting the hyperlink, deployment engine 130 may also transmit to custodian computer 151 instructions for accessing the collector, unless such instructions have not been already transmitted to the custodian.

At this point, the custodian of target system 150 has received the notification that the collection of some data from target system 150 has been requested. The custodian has also received the hyperlink to the collector, the instructions how to access the collector, and the unique deployment key.

In step 418, the custodian of target system 150 uses the unique deployment key to authenticate the custodian to the collector. The custodian may use the unique deployment key to authenticate to the collector to start downloading the collector onto target system 150.

Assuming that the authentication was successful, the custodian, in step 420, downloads the collector from cloud storage 140 onto computer resources of target system 150. Also in this step, the custodian installs the collector on target system 150, and initiates execution of the collector on target system 150.

In step 422, the collector is executed on target system 150 to collect data from computer resources of target system 150. The data collection is performed according to the customization specification embedded in the collector. That includes collecting the particular types of data from the particular resources of target system 150, and storing the collected data in the particular format in cloud storage 140.

Once collection of the requested data is completed, the collector stores, in step 424, the collected data in cloud storage 140, or any other storage resource available to, or managed by, cloud storage 140. Alternatively, the collected data may be transmitted (not depicted in FIG. 4) to deployment server 120, or to requestor computer 110.

Once the collected data is stored in cloud storage 140, cloud storage 140 generates notifications to the interested parties. Although not depicted in FIG. 4, the notifications may also be generated by the collector as the collector finishes collecting the data. The notifications may be used to notify a user of deployment server 120 that the collection of the requested data has been completed and that the requested data have been stored in cloud storage 140. Upon receiving the notification, the user of deployment server 120 may notify, in step 428, the requestor that the collection of the requested data has been completed and that the results have been stored.

Although not depicted in FIG. 4, a similar notification may be transmitted from cloud storage 140 directly to requestor computer 110 to notify the requestor that the data collection task has been completed.

Upon receiving the notification, the requestor may access the collected data. The collected data may be exported from cloud storage 140 in a variety of formats. Non-limiting examples of the formats in which the collected data and data files may be exported is the comma-separated values (CSV) format. The CSV format may be implemented in a variety of ways, but usually it specifies that data records are to be concatenated and each field of the data records be delimited using a comma. The CSV allows exporting tabular data between programs that natively operate on incompatible formats. The CSV is widely supported by a variety of computer systems and devices. Other method of exporting the collected data and data files to cloud storage 140 may also be implemented.

In addition to sending the completion notifications, deployment server 120 may provide the requestor with a data analysis and reporting tool. The tool may be equipped with a graphical user interface for requesting and generating reports pertaining to the data collection. The tool may provide the functionalities for generating a variety of charts depicting the collected data, and the statistical information about the collected data. The functionalities may also include the functionalities for querying the collected data, requesting different subsets of the collected data, and performing data analysis on the subsets of the collected data. The data analysis and reporting tool may be implemented as a software application hosted by a standalone system of deployment server 120, or as a software application executing on deployment server 120.

The process of requesting, collecting, and storing data from target system 150 may be repeated each time when deployment server 120 receives a request for collecting data from target systems. The process may also be repeated when the collector is modified and redeployed. Moreover, the process may be repeated when collection definition data and/or a customization specification is modified or when the collection objectives are changed.

VI. Example Workflow for a Cloud-Based Data Collection

Figure 5:
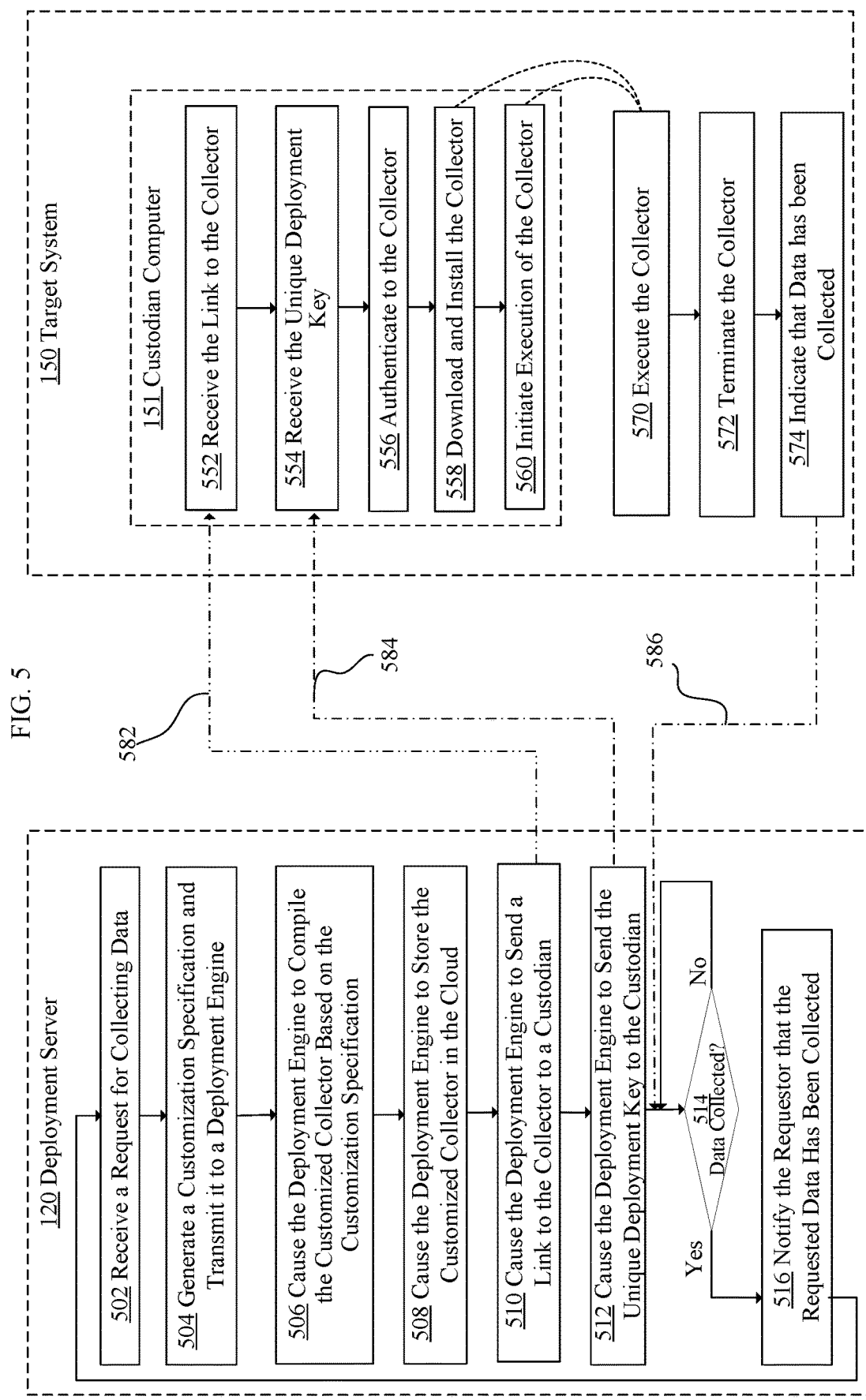
FIG. 5 is a flow diagram that depicts an example approach for collecting data from a target system using a customized, secure, cloud-based data collection tool.

FIG. 5 is a flow diagram that depicts an example approach for collecting data from a target system using a customized, secure, cloud-based data collection tool. The example approach depicted in FIG. 5 is to be viewed as one of many implementations of the cloud-based data collection tool presented herein.

The depicted diagram shows deployment server 120 and target system 150. Deployment server 120 and target system 150 may communicate indirectly, as shown using indicators 582, 584 and 586. The indirect connection between deployment server 120 and target system 150 may include, for example, communications between deployment server 120 and deployment engine 130, communications between deployment engine 130 and cloud system 140, and communications between cloud system 140 and target system 150. These types of communications are depicted for example, in FIG. 1. Although not depicted in FIG. 5, deployment server 120 may communicate directly with target system 150.

Certain steps performed by deployment server 120 are performed in parallel with certain steps performed by target system 150. The performance of these steps may be synchronized in such a way that the completion of a particular step by deployment server 120 may trigger a particular step to be performed by either a custodian computer 151 or the collector executed on target system 150.

As depicted in FIG. 5, steps 502-516 are performed by deployment server 120, steps 552-560 are performed by custodian computer 151, and steps 570-574 are performed by the collector executed on target system 150.

In step 502, deployment server 120 receives a request for collecting data. The request may include a name of the requestor, a name of the project that the requestor is working on, and/or a name of the organization or a party for whom the data collection is requested. The request may also include a name of the matter, and other information related to the data collection. The request may also include information about a time zone in which the user, or the custodian, is located (for timestamping the collected data), and one or more types of file categories that the user wishes to have collected from target system 150. The different types that may be provided in the request may include active files, archived files, database files, emails, empty files, encrypted files, file fragments, system files, financial data, files containing a particular font, form data, game data, graphics and multimedia data, indexes, Internet files, and the like. The request may also provide information about file extensions of the data files that are to be collected. Examples of different files extensions may include DLT, DMD, DMF, DMG, DMP, and the like. The request may also specify one or more system drives (or devices) hosted on target system 150 from which the data is to be collected.

In step 504, deployment server 120 generates a customization specification based on the requirements included in the request. Examples of the customization specification are described in FIG. 3.

Also in this step, deployment server 120 transmits the customization specification to deployment engine 130.

In step 506, deployment server 120 causes deployment engine 130 to generate the collector based on the customization specification. The customization specification may include specifications of types of data to be collected, resources from which the data is to be collected, destinations at which the collected data is to be stored, types of reports that are requested, and the like.

In step 508, deployment server 120 causes storing the collector in cloud-based storage 140. Deployment engine 130 may for example, store the collector at a particular location in cloud-based storage 140, and save a hyperlink to the particular location.

In step 510, deployment server 120 causes sending the hyperlink to the custodian of target system 150. This may be performed automatically once the collector is stored in cloud-based storage 140. Alternatively, deployment server 120 may send specific instructions to deployment engine 130 to transmit the hyperlink to the custodian.

In step 512, deployment server 120 causes generating a unique, one-time deployment key for accessing the collector. This may be performed automatically once the collector is stored in cloud-based storage 140. Alternatively, deployment server 120 may send specific instructions to deployment engine 130 to generate the key, and to transmit the key to the custodian. This step may be omitted if deployment server 120 transmits the unique deployment key directly to the custodian and without any assistance from deployment engine 130.

In step 514, deployment server 120 tests whether it received any indication that the requested data has been collected and stored in cloud storage 140. For example, deployment server 120 may test whether it received a notification from deployment engine 130, cloud storage 140, or the collector itself, indicating that the data collection has been completed and the collected data has been stored in cloud storage 140. Alternatively, the notification may be received from target system 150 when the execution of the collector is finished or terminated.

If deployment server 120 determined that the requested data has been collected, then in step 516, deployment server 120 notifies the requestor that the requested data has been collected and stored in cloud storage 140. Notifying the requestor may also include providing a hyperlink to the location at which the collected data is stored in cloud server 140. This may also include providing encryption keys for decrypting the stored, collected data if the data has been already encrypted. Furthermore, this may include providing instructions for accessing the stored, collected data, and instructions indicating how long the stored data will be available in cloud storage 140.

However, if deployment server 120 does not receive a notification that the requested data has been collected and stored, then deployment server 120 may continue waiting for the notification. Upon the expiration of a certain time period, deployment server 120 may generate a notification to the requestor that the data collection was unsuccessful, and transmit the notification to the requestor. Deployment server 120 may also send an inquiry to the requestor to seek an indication from the requestor whether to repeat execution of the collector on target system 150, or whether to generate a new collector for collecting the data from target system 150. In response to transmitting the inquiry to the requestor, deployment service 120 may receive a new request for generating a new collector, or an indication for re-executing the already-generated collector.

The steps 502-516 may be repeated each time deployment server 120 receives requests for collecting data from target systems.

Steps 552-560 are performed by custodian computer 151, while steps 570-574 are performed by the collector executed on target system 150.

In step 552, custodian computer 151 of target system 150 receives the hyperlink to the location at which the collector is stored in cloud storage 140. Depending on the implementation, the custodian may receive the hyperlink directly from deployment engine 130 or from deployment server 120. The custodian may use the received hyperlink to access the collector stored in cloud storage 140.

In step 554, custodian computer 151 receives the unique deployment key for accessing the collector stored in cloud system 150. Depending on the implementation, the custodian may receive the unique deployment key directly from deployment engine 130 or from deployment server 120. The custodian may use the unique deployment key to access the collector.

In step 556, custodian computer 151 uses the unique deployment key to access the collector. For example, the custodian may invoke a web browser on custodian computer 151, and use the Web browser that allows the custodian to provide the hyperlink and the unique deployment key. Upon receiving the unique deployment key from the custodian, cloud storage 140 may verify whether the provided key is a valid key for accessing the collector. If the authentication is successful, then the custodian downloads the collector onto target system 150, installs the collector on target system 150, and initiates execution of the collector. However, if the authentication is unsuccessful, then cloud storage 150 may generate an error message and communicate the error message to either deployment engine 130 or deployment server 120, or both.

In step 558, it is assumed that the authentication was successful. In this step, the custodian downloads the collector onto target system 150. Also in this step, the collector is installed on a custodian's computer, or the resources of target system 150. For example, the collector may be installed on custodian computer 151 or any other device of target system 150 depicted in FIG. 1.

In step 560, the custodian initiates execution of the collector on target system 150. This may include collecting the particular data from the particular resources of target system 150. Details of the data collection are described in FIG. 1.

In step 570, the collector is executed, and the requested data is collected and stored in cloud storage 140. The collected data may be encrypted to provide security to the data collection process.

Once the execution of the collector is finished, the collector is terminated in step 572. This may be performed automatically as the collector completes the data collection. Alternatively, this may be performed upon receiving a request from the custodian or upon an expiration of a certain time period.

In step 574, a notification is generated to indicate that the data collection has been completed and that the collected data has been stored in cloud storage 140. The notification may be generated by the collector itself before the collector is terminated, or by the custodian upon receiving an indication that the data collection has been completed. The notification may be transmitted from target system 150 to deployment server 120, or to deployment engine 130, which then may communicate the notification to deployment server 120. Upon receiving the notification, deployment server 120 may transmit the notification to the requestor who requested the data to be collected.

Upon receiving the notification that the data collection has been completed, the requestor may display the collected data, and/or generate reports about the collected data. The reports generated based on the collected data may be exported using different data formats. For example, a report may be formatted in accordance with the CSV format, described above.

VII. Benefits of Certain Embodiments

In an embodiment, an approach is presented for collecting electronic data from target systems for the purpose of performing data discoveries, including legal discoveries and audit requests. Collecting the electronic data is performed in a customized manner, which allows collecting only the requested data and data files, and not all data from all computer resources of the target systems.

Collecting the data is secure because access to a customized collector requires providing a unique deployment key, and because the collected data is encrypted and compressed.

The approach allows storing the collected data in any network storage system, including cloud systems hosted in a distributed network of servers.

Furthermore, the approach allows preserving the integrity and security of the collected data. For example, the approach allows performing the data collection independently and without an actual involvement of the data users or the data collection requestor.

The approach may be implemented in a system that can be accessed automatically and without demonstrating any specialized knowledge or experience in performing a data collection.

The presented approach also utilizes a robust, data analysis and reporting tool that allows generating various reports based on the collected data. The reports may be customized in many different ways, and provide the functionalities to fine tune the results of the collected data.

VIII. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
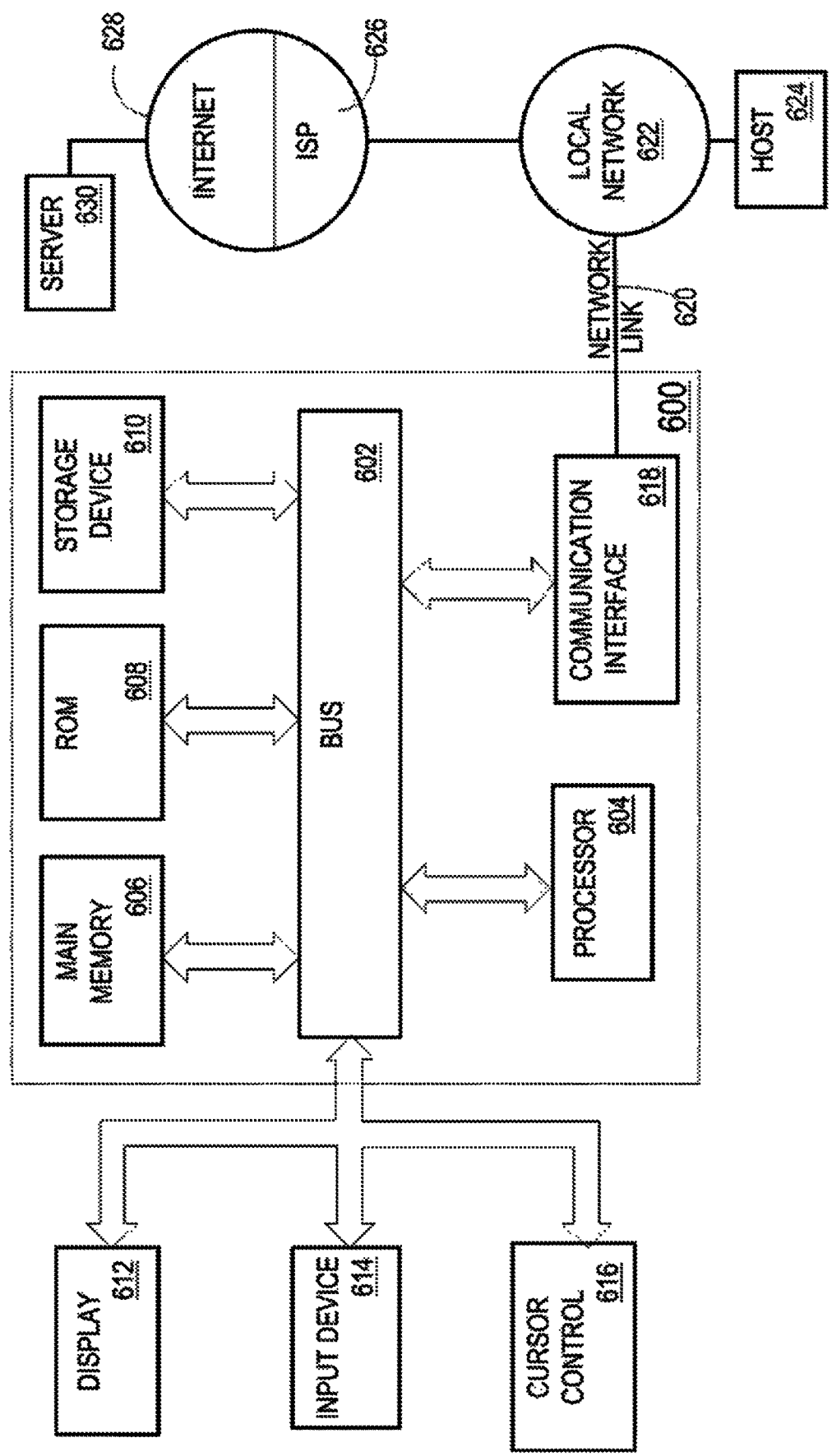
FIG. 6 is a block diagram of a computer system on which embodiments may be implemented.

FIG. 6 is a block diagram that depicts an example computer system 600 upon which embodiments may be implemented. Computer system 600 includes a bus 602 or other communication mechanism for communicating information, and a processor 604 coupled with bus 602 for processing information. Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated service digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage media storing instructions which, when processed by one or more processors, cause:
   receiving a request to perform a data collection on one or more target computer resources;
   wherein the request includes one or more requirements that are specific to the data collection to be performed on the one or more target computer resources;
   based on, at least in part, the one or more requirements, generating a customization specification for generating a customized collector that is specific to the data collection to be performed on the one or more target computer resources;
   transmitting the customization specification to a deployment engine to cause the deployment engine to:
      based on, at least in part, the customization specification, generate the customized collector that is specific to the data collection to be performed on the one or more target computer resources;
      transmit the customized collector, for generating the customized collector, to a cloud storage;
      generate a unique deployment key that is specific to the customized collector;
      notify a custodian of the one or more target computer resources that the unique deployment key is provided to the custodian via one or more particular media;
      provide the unique deployment key to the custodian of the one or more target computer resources; and
      wherein, upon receiving the unique deployment key, the unique deployment key is used by the custodian to authenticate the custodian to the customized collector, and, in response to the custodian being successfully authenticated to the customized collector, the customized collector is downloaded onto a custodian computer from the cloud storage and executed.

2. The one or more non-transitory computer-readable storage media of claim 1, wherein the customization specification specifies one or more of: one or more file types of data to be collected, the one or more target computer resources from which the data is to be collected, a time zone for collecting the data, a case name, a chunk size, an expiry date, a signature analysis indicator, a parse/compress indicator, a parse email indicator, one or more local disks indicators, one or more removable disks indicators, or one or more mapped network shares indicators;
   wherein the one or more file types include one or more of: document files, image files, spreadsheet files, attachments, system files, hidden files, archive files, or email files;
   wherein one or more data files are collected if their respective file signatures match any of the one or more file types; and
   wherein a signature of a file is a unique code embedded in the file.

3. The one or more non-transitory computer-readable storage media of claim 1, storing additional instructions which, when executed by the one or more processors, cause the one or more processors to perform:
   causing the deployment engine to download the customized collector to a collector computer and initiate execution of the customized collector to perform the data collection from the one or more target computer resources; and
   wherein execution of the customized collector to perform the data collection from the one or more target computer resources includes collecting data that is specified by the customization specification.

4. The one or more non-transitory computer-readable storage media of claim 1,
   wherein the one or more particular media include one or more of: an email, an audio message, or a letter.

5. The one or more non-transitory computer-readable storage media of claim 1, storing additional instructions which, when executed by the one or more processors, cause the one or more processors to perform:
   determining whether performing the data collection on the one or more target computer resources has been finished; and
   in response to determining that performing the data collection on the one or more target computer resources has been finished, generating a notification to a requestor who sent the request to perform the data collection; and
   wherein the notification indicates a location, in the cloud storage, at which results of the data collection have been stored.

6. The one or more non-transitory computer-readable storage media of claim 1, storing additional instructions which, when processed by the one or more processors, cause:
   receiving a report request; and
   in response to receiving the report request, accessing the data stored in the cloud storage, and generating a report that presents information about the data in a format specified by the report request.

7. The one or more non-transitory computer-readable storage media of claim 1, wherein data collected by executing the customized collector is encrypted and compressed.

8. A method for generating a customized, cloud-based data collection tool for collecting data from computer resources of a target system, the method comprising:
receiving a request to perform a data collection on one or more target computer resources;
wherein the request includes one or more requirements that are specific to the data collection to be performed on the one or more target computer resources;
based on, at least in part, the one or more requirements, generating a customization specification for generating a customized collector that is specific to the data collection to be performed on the one or more target computer resources;
transmitting the customization specification to a deployment engine to cause the deployment engine to:
based on, at least in part, the customization specification, generate the customized collector that is specific to the data collection to be performed on the one or more target computer resources;
transmit the customized collector, for generating the customized collector, to a cloud storage;
generate a unique deployment key that is specific to the customized collector;
notify a custodian of the one or more target computer resources that the unique deployment key is provided to the custodian via one or more particular media;
provide the unique deployment key to the custodian of the one or more target computer resources; and
wherein, upon receiving the unique deployment key, the unique deployment key is used by the custodian to authenticate the custodian to the customized collector, and, in response to the custodian being successfully authenticated to the customized collector, the customized collector is downloaded onto a custodian computer from the cloud storage and executed.

9. The method of claim 8, wherein the customization specification specifies one or more of: one or more file types of data to be collected, the one or more target computer resources from which the data is to be collected, a time zone for collecting the data, a case name, a chunk size, an expiry date, a signature analysis indicator, a parse/compress indicator, a parse email indicator, one or more local disks indicators, one or more removable disks indicators, or one or more mapped network shares indicators;
wherein the one or more file types include one or more of: document files, image files, spreadsheet files, attachments, system files, hidden files, archive files, or email files;
wherein one or more data files are collected if their respective file signatures match any of the one or more file types; and
wherein a signature of a file is a unique code embedded in the file.

10. The method of claim 8, further comprising:
causing the deployment engine to download the customized collector to a collector computer and initiate execution of the customized collector to perform the data collection from the one or more target computer resources; and
wherein execution of the customized collector to perform the data collection from the one or more target computer resources includes collecting data that is specified by the customization specification.

11. The method of claim 8, wherein the one or more particular media include one or more of: an email, an audio message, or a letter.

12. The method of claim 8, further comprising:
determining whether performing the data collection on the one or more target computer resources has been finished; and
in response to determining that performing the data collection on the one or more target computer resources has been finished, generating a notification to a requestor who sent the request to perform the data collection; and
wherein the notification indicates a location, in the cloud storage, at which results of the data collection have been stored.

13. The method of claim 8, further comprising:
receiving a report request; and
in response to receiving the report request, accessing the data stored in the cloud storage, and generating a report that presents information about the data in a format specified by the report request.

14. The method of claim 8, wherein data collected by executing the customized collector is encrypted and compressed.

15. A computer-implemented, deployment system for generating customization specifications for a customized collector, the computer-implemented, deployment system comprising:
one or more hardware processors;
one or more memory units for storing computer instructions which, when processed by the one or more hardware processors, cause the one or more processors to perform:
receiving a request to perform a data collection on one or more target computer resources;
wherein the request includes one or more requirements that are specific to the data collection to be performed on the one or more target computer resources;
based on, at least in part, the one or more requirements, generating a customization specification for generating a customized collector that is specific to the data collection to be performed on the one or more target computer resources;
transmitting the customization specification to a deployment engine to cause the deployment engine to:
based on, at least in part, the customization specification, generate the customized collector that is specific to the data collection to be performed on the one or more target computer resources;
transmit the customized collector, for generating the customized collector, to a cloud storage;
generate a unique deployment key that is specific to the customized collector;
notify a custodian of the one or more target computer resources that the unique deployment key is provided to the custodian via one or more particular media;
provide the unique deployment key to the custodian of the one or more target computer resources; and
wherein, upon receiving the unique deployment key, the unique deployment key is used by the custodian to authenticate the custodian to the customized collector, and, in response to the custodian being successfully authenticated to the customized collector, the customized collector is downloaded onto a custodian computer from the cloud storage and executed.

16. The computer-implemented, deployment system of claim 15, wherein the customization specification specifies one or more of: one or more file types of data to be collected, the one or more target computer resources from which the data is to be collected, a time zone for collecting the data, a case name, a chunk size, an expiry date, a signature analysis indicator, a parse/compress indicator, a parse email indicator, one or more local disks indicators, one or more removable disks indicators, or one or more mapped network shares indicators;
  wherein the one or more file types include one or more of: document files, image files, spreadsheet files, attachments, system files, hidden files, archive files, or email files;
  wherein one or more data files are collected if their respective file signatures match any of the one or more file types; and
  wherein a signature of a file is a unique code embedded in the file.

17. The computer-implemented, deployment system of claim 15, storing additional instructions which, when executed by the one or more processors, cause the one or more processors to perform:
  causing the deployment engine to download the customized collector to a collector computer and initiate execution of the customized collector to perform the data collection from the one or more target computer resources; and
  wherein execution of the customized collector to perform the data collection from the one or more target computer resources includes collecting data that is specified by the customization specification.

18. The computer-implemented, deployment system of claim 15,
  wherein the one or more particular media include one or more of: an email, an audio message, or a letter.

19. The computer-implemented, deployment system of claim 15, storing additional instructions which, when executed by the one or more processors, cause the one or more processors to perform:
  determining whether performing the data collection on the one or more target computer resources has been finished; and
  in response to determining that performing the data collection on the one or more target computer resources has been finished, generating a notification to a requestor who sent the request to perform the data collection; and
  wherein the notification indicates a location, in the cloud storage, at which results of the data collection have been stored.

20. The computer-implemented, deployment system of claim 15, storing additional instructions which, when processed by the one or more processors, cause:
  receiving a report request; and
  in response to receiving the report request, accessing the data stored in the cloud storage, and generating a report that presents information about the data in a format specified by the report request.

* * * * *